United States Patent [19]

Farenden et al.

[11] Patent Number: 4,845,979

[45] Date of Patent: Jul. 11, 1989

[54] ELECTRONIC FUEL INJECTOR SERVICE DEVICE

[75] Inventors: Mark F. Farenden, Cecil Park; Gerard S. McGinty, Woodbine; Peter F. Schoenfeld, Benkennie, all of Australia

[73] Assignee: Ferocem Proprietary Limited, New South Wales, Australia

[21] Appl. No.: 96,603

[22] Filed: Sep. 11, 1987

[51] Int. Cl.⁴ .......... G01M 19/00
[52] U.S. Cl. .......... 73/119 A
[58] Field of Search .......... 73/119 A, 3; 239/74

[56] References Cited

U.S. PATENT DOCUMENTS 4,088,012 5/1978 Emerson .......... 73/119 A

*Primary Examiner*—Jerry W. Myracle
*Attorney, Agent, or Firm*—Ladas & Parry

[57] ABSTRACT

A device to aid in the servicing of electronic fuel injectors for automotive engines, the device includes a mounting to receive the injectors so that the nozzles thereof are exposed to be viewed by an operator, a liquid under pressure is delivered to the injectors together with an electronic pulse to operate the valve mechanisms within the injectors, the device further includes a second mounting within which the injectors are mounted enabling the injectors to be subjected to a backwashing procedure to clean the filters within the injectors.

4 Claims, 4 Drawing Sheets

ELECTRONIC FUEL INJECTOR SERVICE DEVICE

The present invention relates to devices to service fuel injectors for motors and more particularly but not exclusively to electrically operated fuel injectors.

Currently available apparatus to test electrically operated fuel injectors is designed for a laboratory environment and is further designed merely to test new injectors as opposed to servicing injectors actually in use. Accordingly these known apparatus are not suited to a workshop environment where automotive fuel injectors are tested and serviced for reinstallation in an engine.

Since these previously known devices have been merely designed to test new injectors, they are not adapted to clean injectors previously in use.

It is the object of the present invention to overcome or substantially ameliorate the above disadvantages.

There is disclosed herein a servicing device for engine fuel injectors having a fuel inlet, a nozzle outlet from which fuel is sprayed, and electrically operated valve means operable to permit liquid to flow from the inlet to the nozzle; said device comprising a mounting means to receive at least one injector; passage means extending through said mounting means and to sealingly communicate with said nozzle so as to deliver a liquid under pressure thereto, control means couplable to said injector, and operable to deliver electric signals thereto to operate the injector valve means, a pump having an outlet connected to said passage so as to deliver said liquid under pressure thereto, and wherein in a first operative mode, said passage means is sealingly connected to the inlet of said injector so that the liquid under pressure is delivered thereto with said nozzle being viewable by an operator so that the operator can inspect the liquid sprayed from said nozzle as a result of said signals being delivered to said injector, while when in a second operative mode said passage means is sealingly connected to said nozzle so that the liquid under pressure is delivered thereto so as to cause the liquid to flow in a reverse direction through said nozzle, relative to the normal operative liquid flow direction.

A preferred form of the present invention will now be described by way of example with reference to the accompanying drawings, wherein.

Figure 1:
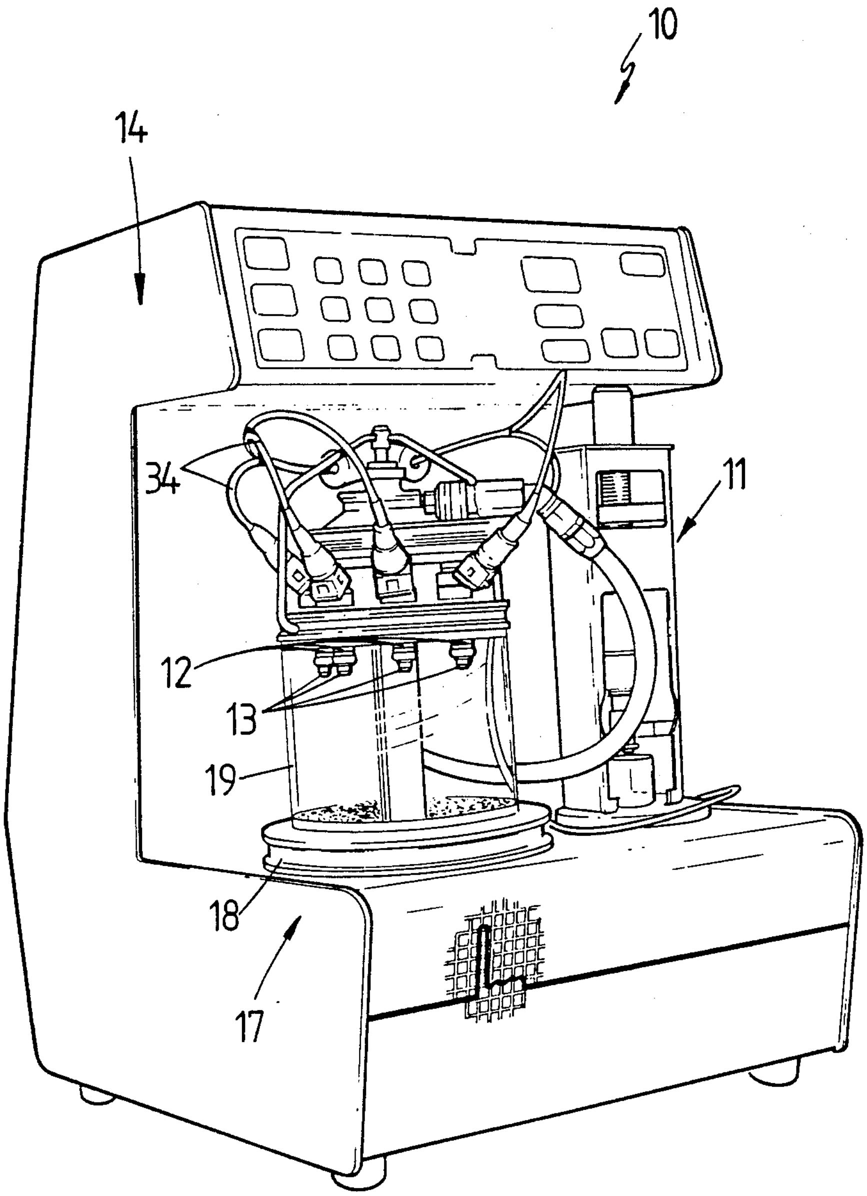
FIG. 1 is a schematic perspective view of a device to aid in the servicing of electronic fuel injectors employed in internal combustion engines.

In the accompanying drawings there is schematically depicted a service device 10 to aid in the servicing of electronic fuel injectors 12 employed in internal combustion piston engines, particularly automotive engines. The device 10 provides a means of cleaning the injectors 12 as well as testing them. The test includes a visual inspection of the spray pattern which issued from the nozzles 13 of the injectors 12.

The device 10 includes a hollow body 14 within which there is housed a pump 15 whose output is controlled by means of a control unit 16 so that a liquid (preferably a solvent) is delivered to the injectors 12. The control unit 16 also delivers electrical signals to the injectors 12 to operate the valve mechanisms thereof to test the injectors and to enable an operator to observe the spray pattern issuing from the nozzles 13.

Mounted on the body 14 is a canister 17 consisting of a base 18 which receives a cylinder 19 formed of glass, perspex or other transport material. Mounted above the cylinder 19 is a mounting member 20 which receives one or more of the injectors 12.

Figure 2:
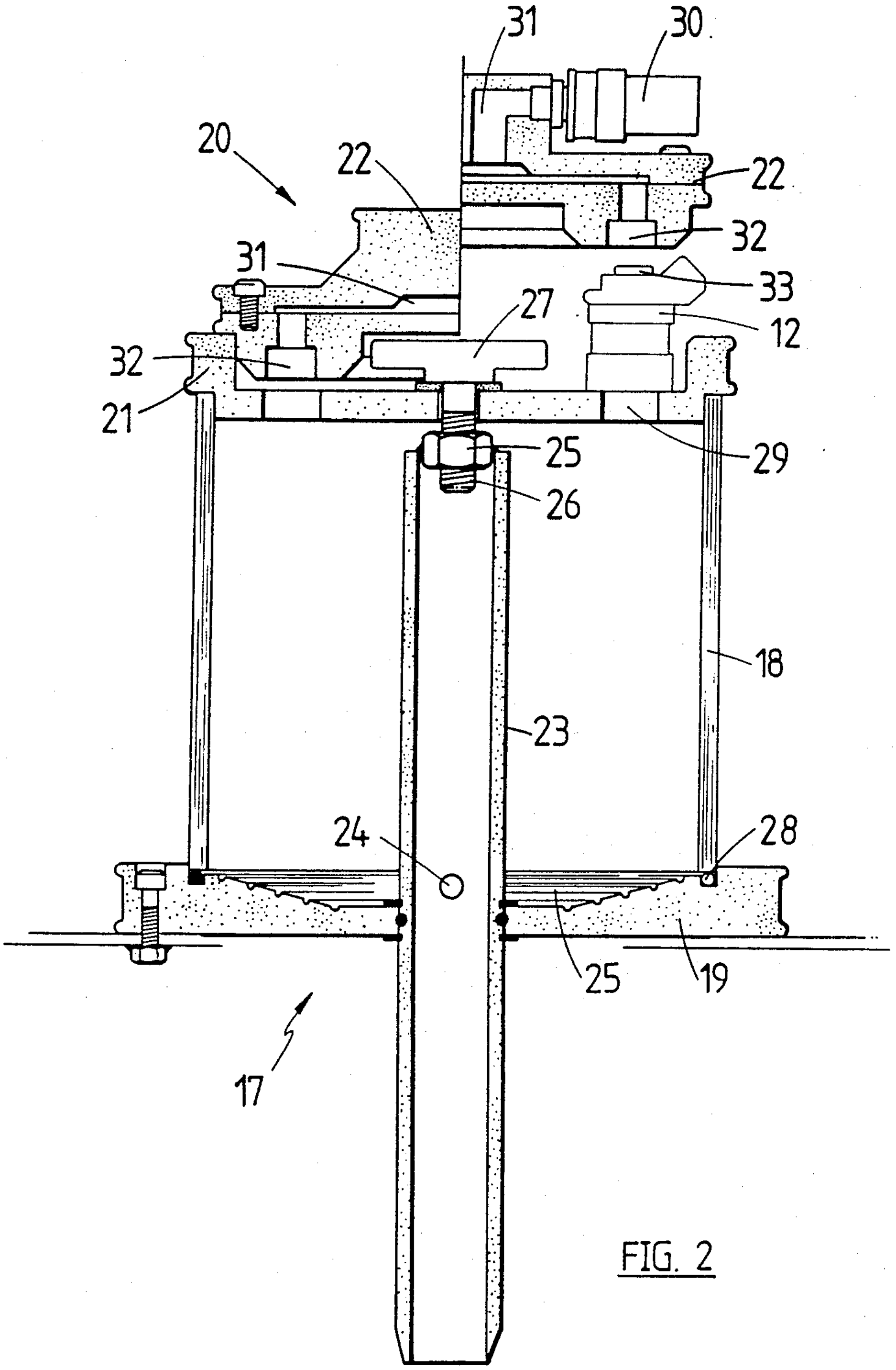
FIG. 2 is a schematic parts sectioned side elevation of a portion of the device of FIG. 1.
Figure 3:
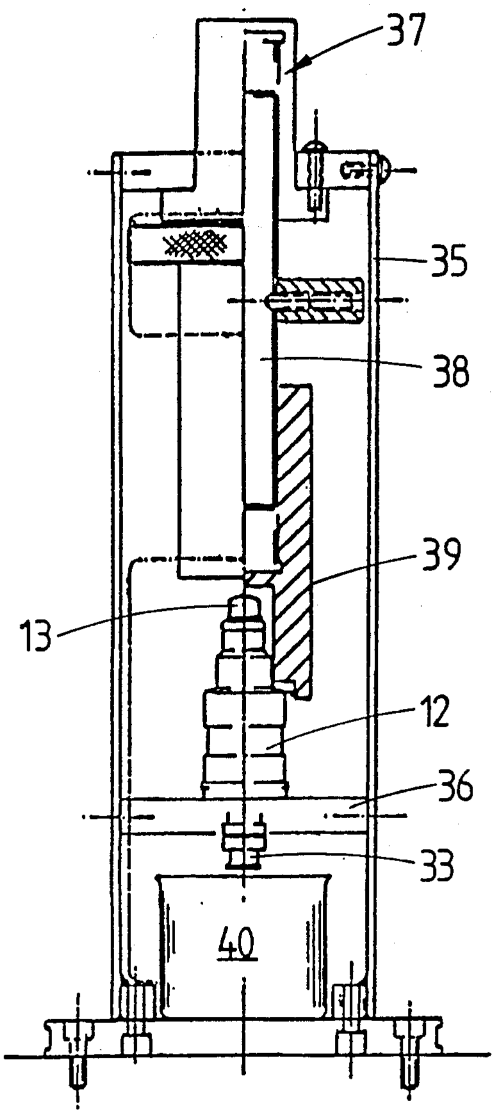
FIG. 3 is a schematic part sectioned side elevation of a backwash assembly of the device of FIG. 1.

The canister assembly 17 is more fully depicted in FIG. 2. As can be seen from FIG. 2, the mounting member 20 includes a mounting plate 21 which receives a cap 22. The left hand portion of FIG. 2 is a section through the canister assembly 17, with the cap 22 in an inoperative position resting on the mounting plate 21. The right hand portion of the FIG. 2 shows the cap 22 in a slightly raised position ready to engage the injector 12. Fixed to the base 19 is a vented return tube 23 having one or more openings 24 enabling the liquid 25 to return to a reservoir. The upper end of the tube 23 has fixed to it a threaded member 25 which engages a threaded shaft 26 fixed to a knob 27. The cylinder 18 abuts a seal member 28 and is forced into engagement therewith by the mounting plate 21. Upon tightening the know 27, the cylinder 18 is brought into sealing contact with the seal 28.

The mounting plate 28 is provided with a plurality of mounting apertures 29 into which the injectors 12 are inserted. With the injectors 12 in position the cap 22 is lowered into sealing contact therewith and is clamped in position. The cap 22 is provided with an inlet coupling 30 communicating with a passage 31 to which the liquid is delivered under pressure. The passage 21 communicates with cap outlet 32 which in turn communicates with the injector inlet 33.

The control unit 16 also delivers electric pulses via the leads 34 to the injectors 12. These pulses cause actuation of the valve mechanisms within the injectors 12 so as to allow liquid to pass from the injector inlet 33 to the outlet nozzle 13 of each injector 12. The control unit 16 can be programmed to select the pulse width and frequency in order to simulate various operating conditions which the injectors 12 would experience in normal use.

Also mounted on the housing 14 is a backwash assembly 11 consisting of a hollow body 35 provided with a base 36 upon which the injector 12 to be tested is mounted. In this particular instance, the injector 12 is mounted so that the nozzle 13 is projecting upwards. Mounted at the upper end of the body 35 is a pressure delivery assembly 37 consisting of a conduit 38 terminating with a tube 39 which can be brought down into sealing contact with the injector 12. Once in sealing contact with the injector 12, liquid under pressure is delivered to the assembly 37 so as to force the liquid to pass through the injector 12 from the nozzle 13 to the inlet 33. The liquid is then collected in a receptacle 40. In this particular operation it should be appreciated that the liquid passing through the injector 12 is flowing in a direction which is the reverse of the normal operating fluid flow direction of the injector 12. This reverse flow aids in cleaning any filters which may be provided in the injector 12.

Figure 4:
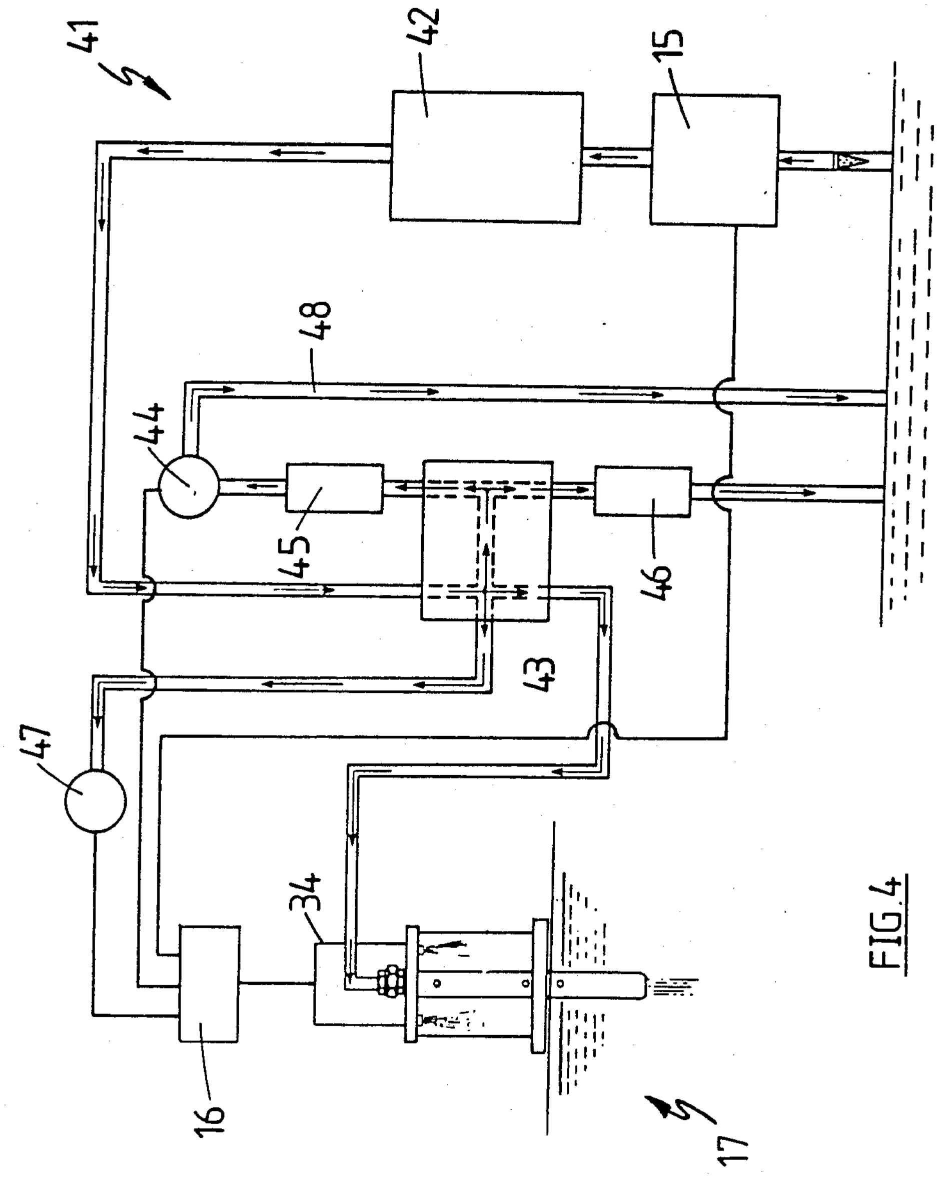
FIG. 4 is a schematic circuit of the device of FIG. 1.

Now with particular reference to FIG. 4 wherein the hydraulic circuit of the device 10 is more fully depicted. The circuit 41 includes the pump 15 which is driven so as to deliver a liquid under pressure to a filter 42. The liquid then passes from the filter 42 to a distribution block 43. The distribution block 43 allows the liquid to be delivered under pressure to the canister assembly 17 and the backwash assembly 11. To determine the pressure at which the liquid is delivered to the canister assembly 17 and backwash assembly 11, there is provided a low pressure solenoid valve 44. Positioned between the valve 44 and the distribution block 43 is a low pressure regulator 45 while the distribution block 43 also directs liquid under pressure to the high pressure regulator 46. A further solenoid valve 47 selectively allows liquid under pressure to be delivered to the backwash assembly 11.

The operation of the valves 44 and 47, and the pump 15 are governed by the control unit 16.

In operation of the above described device 10, once the injectors 12 are mounted within the canister assembly 17 and are to be tested, the solenoid valve 44 is activated so that liquid under pressure is delivered to the conduit 48. Accordingly the pressure within the circuit 47 is a low pressure determined by the regulator 45. This low pressure is for use in testing electronic fuel injectors. When required, the solenoid valve 43 can be operated to allow liquid under pressure to be used for backwashing purposes. If the device 10 is to be used in servicing pressure operated injectors, the valve 43 is operated so as to be closed thereby leaving the regulator 46 to determine the pressure within the circuit 41.

What we claim is:

1. A servicing device for engine fuel injectors having a fuel inlet, a nozzle outlet from which fuel is sprayed, and electrically operated valve means operable to permit liquid to flow from the inlet to the nozzle; said device comprising a mounting means to receive at least one injector, said mounting means including a first mounting which receives the injectors in a first mode of operation, and a second mounting to receive the injectors in a second mode of operation; passage means extending through said mounting means and to sealingly communicate with said nozzle so as to deliver a liquid under pressure thereto, control means couplable to said injector, and operable to deliver electric signals thereto to operate the injector valve means, a pump having an outlet connected to said passage so as to deliver said liquid under pressure thereto, and wherein in said first operative mode, said passage means is sealingly connected to the inlet of said injector so that the liquid under pressure is delivered thereto with said nozzle being viewable by an operator so that the operator can inspect the liquid sprayed from said nozzle as a result of said signals being delivered to said injector, while when in said second operative mode said passage means is sealingly connected to said nozzle so that the liquid under pressure is delivered thereto so as to cause the liquid to flow in a reverse direction through said nozzle, relative to the normal operative liquid flow direction.

2. The device of claim 1 wherein said first mounting includes a transparent member encompassing a hollow into which the nozzles project, a mounting plate secured to said transparent member and being adapted to receive said injectors, and a cap means to engage the inlets of the injectors so as to deliver the liquid thereto.

3. The device of claim 2 further including a drain to return the liquid to a reservoir.

4. The device of claim 3 further including a hydraulic circuit including said pump, a first pressure regulator set at a predetermined pressure and to exhaust to said reservoir, a second regulator set at a pressure lower than said predetermined pressure, selectively operable valve means to selectively connect said second regulator to said reservoir so that upon activation of said selectively operable valve means to connect said second regulator to said reservoir, the pressure delivered to said passage means is lower than if said selectively operable valve means was not activated therefore isolating said second regulator from said reservoir.

* * * * *